United States Patent [19]

Vollkommer et al.

[11] 3,947,402

[45] Mar. 30, 1976

[54] PROCESS FOR THE MANUFACTURE OF POLYIMIDE PRODUCTS

[75] Inventors: Norbert Vollkommer; Erich Behr, both of Troisdorf, Germany

[73] Assignee: Dynamit Nobel Aktiengesellschaft, Troisdorf, Germany

[22] Filed: Jan. 26, 1973

[21] Appl. No.: 326,617

[30] Foreign Application Priority Data

Feb. 1, 1972 Germany ............................ 2204532

[52] U.S. Cl. ...... 260/30.2; 260/32.6 NT; 260/78 TF

[51] Int. Cl.[2] ........................................ C08G 73/10

[58] Field of Search ........ 260/30.2, 78 TF, 32.6 NT

[56] References Cited

UNITED STATES PATENTS

| | | | |
|---|---|---|---|
| 3,179,634 | 4/1965 | Edwards | 260/78 |
| 3,673,145 | 6/1972 | Minami | 260/32.4 N |
| 3,705,875 | 12/1972 | Browning | 260/63 N |
| 3,732,200 | 5/1973 | Bach | 260/144 |

FOREIGN PATENTS OR APPLICATIONS

| | | |
|---|---|---|
| 670,611 | 1965 | Belgium |

*Primary Examiner*—Lewis T. Jacobs
*Assistant Examiner*—S. M. Person
*Attorney, Agent, or Firm*—Burgess, Dinklage & Sprung

[57] ABSTRACT

In a process for the manufacture of a polyimide from a polyamide carboxylic acid solution by cyclodehydration of the polyamide carboxylic acid, the improvement which comprises carrying out said cyclodehydration in the presence of a nitrogen containing compound selected from the group consisting of quinoline, isoquinoline, mono-substituted alkyl pyridines, dialkyl substituted pyridines, mono-substituted alkyl quinolines, dialkyl substituted quinolines, monoaralkyl substituted quinolines, diaralkyl substituted quinolines, monoalkyl substituted isoquinolines, dialkyl substituted isoquinolines, monoaralkyl substituted isoquinolines, diaralkyl substituted isoquinolines and mixtures thereof.

20 Claims, No Drawings

PROCESS FOR THE MANUFACTURE OF POLYIMIDE PRODUCTS

BACKGROUND OF THE INVENTION

1. Field of the Invention

This invention is directed to polyimide products, especially polyimide sheet materials. More particularly, this invention is directed to a process for forming polyimide products of exceptional physical properties where the polyimide is formed by the cyclodehydration of a polyamide carboxylic acid, especially from a solution thereof in an aprotic solvent. More particularly, this invention is directed to such polyimide articles and to polyamide carboxylic acid solutions containing certain nitrogen compounds which provide the resultant polyimide with improved mechanical properties.

2. Discussion of the prior Art

Polyimide products, especially polyimide (PI) sheet materials and coatings, find many applications as a result of their interesting mechanical, thermal and electrical properties, being used, for example, as electrical insulating sheet materials for lining slots in electric motors.

For the manufacture of PI films, the starting material is, as a rule, a solution of a polyamide carboxylic acid (PACA) in polar solvents or solvent mixtures. The PACA is a still soluble polymeric intermediate of PI and can be obtained by the reaction of virtually equimolar proportions of diamine and dianhydride in the presence of aprotic polar solvents such as dimethyl formamide, dimethylacetamide or N-methylpyrrolidone (German Offenlegungsschrift No. 1,420,706). The insoluble polyimide itself is then obtained by evaporating the solvent after fabrication, followed by cyclodehydration of the PACA to the PI.

The cyclodehydration of the PACA to the PI may be performed by heat treatment alone at very high temperatures — between 200° and 400°C, as a rule — or it can performed at moderately elevated temperatures between 20° and 80°C in the presence of certain chemical agents (German Offenlegungsschrift No. 1,520,519). Carboxylic acid anhydrides, preferably acetic anhydrides or benzoic acid anhydride, have proven necessary for the chemical dehydration process. One disadvantage of the process of chemical cyclodehydration lies in the greater technological investment and the cost of the reagents, so that it has not yet achieved the importance of thermal cyclization.

Through the variation both of the diamine and of the dianhydride a plurality of structurally different polyimides can be manufactured. Probably the most interesting combination as regards characteristics and manufacturing cost is the polyimide based on pyromellitic acid dianhydride (PMDA) and diaminodiphenylether (DADE).

Although the properties of the polyimides are satisfactory, by and large, some of the mechanical characteristics, such as elongation and reflex folding frequency are not adequate for a number of purposes. The term "reflex folding frequency", as used herein, refers to the ability of a sheet of the polyimide to resist breakage when the same is folded back and forth on the same line. Thus, a high reflex folding frequency is determined by folding, at ambient temperature, a sheet of polyimide back and forth on the same line until the same fails, i.e., until there is a breakage at the line.

Additionally, the polyimide sheets generally have a good tensile strength ranging from 600 to 1,000 kp/cm$^2$ (German Auslegeschrift No. 1,202,981). Elongations of these polyimide (PI) sheets when obtained from thermal cyclodehydration generally ranges from between 6 and 14% (see German Auslegeschrift No. 1,202,981, supra). However, the reflex folding frequency is usually only several tens of thousands, e.g., 50,000, and such low reflex folding frequency value is considered insufficient for many applications, especially in the electrical industry.

It is an object of the invention, therefore, to develop a process for the manufacture of PI sheet materials with substantially improved mechanical properties such as tensile strength, elongation and reflex folding frequency. This object has been achieved in a surprisingly simple manner, the process being one that is technically easy to perform.

SUMMARY OF THE INVENTION

In accordance with this invention, there is provided an improved method for preparing polyimide articles where a polyamide carboxylic acid precursor is cyclodehydrated to the polyimide, which improvement comprises carrying out the cyclodehydration in the presence of a nitrogen compound selected from the group consisting of quinoline, isoquinoline, a monoalkyl substituted pyridine, a dialkyl substituted pyridine, a monoaralkyl substituted pyridine, a diaralkyl substituted pyridine, a monoalkyl substituted quinoline, a dialkyl substituted quinoline, a monoaralkyl substituted quinoline, a diaralkyl substituted quinoline, a monoalkyl substituted isoquinoline, a dialkyl substituted isoquinoline, a monoaralkyl substituted isoquinoline, a diaralkyl substituted isoquinoline and mixtures thereof.

The cyclodehydration product when a polyamide carboxylic acid solution is cyclodehydrated can be significantly improved with respect to its physical properties by carrying out the cyclodehydration in the presence of quinoline, isoquinoline, mono- or dialkyl substituted pyridines, quinolines or isoquinolines or mixtures thereof. Additionally, there may be employed during the cyclodehydration step mono- or diaralkyl substituted pyridines. The so formed polyimide is characterized by having a reflex folding frequency of at least 100,000 and an elongation of at least 35% at break. Additionally, the tensile strength of the so formed polyimide, in sheet form, is at least 1,100 and ranges between 1,100 and 1,400 kp/cm$^2$.

The cyclodehydration step is generally performed at a temperature between 120° and 500°C, preferably between 200° and 400°C. No chemical dehydration agents, such as acetic anhydride, need be present.

In carrying out the invention the mono- or dialkyl substituted pyridines or the mono- or dialkyl substituted quinolines or the mono- or dialkyl substituted isoquinolines have between 1 and 10 carbon atoms in each alkyl substituent. The preferred polyamide carboxylic acid employed to prepare the polyimide is one chemically based upon pyromellitic acid dianhydride and diaminodiphenylether.

DESCRIPTION OF SPECIFIC EMBODIMENTS

The manufactured products may be of any kind desired. They can be in the form of boards, films, fibers, or filaments, foams or coatings on metals, wood, paper or fabrics, fleeces or threads. Preferred is the production of films, coatings and filaments, because here the greatly improved elongation and folding qualities are very advantageous.

It has been found that the tensile strength can be perceptibly improved, and the elongation as well as the reflex folding frequency of PI films obtained by the thermal method can be decisively improved if the PACA solution from which the articles are formed contains small amounts of the aromatic tertiary amines mentioned.

Particularly effective tertiary amines in the meaning of the invention are certain substituted pyridines. While the basic substance pyridine is virtually ineffective, quinoline especially, but also isoquinoline as well as the alkyl-or analkyl-substituted pyridines such as the picolines, e.g., 2-methylpyridine; 3-methylpyridine; 4-methylpyridine, the lutidines, e.g., 2,4-dimethylpyridine; 2,5-dimethylpyridine; 2,6-dimethylpyridine; 3,5-dimethylpyridine, 2,3-dimethylpyridine, and the pyridines which are substituted or di-substituted in position 2, 3 or 4 with alkyl radicals of 2 to 10 carbon atoms, such as 2-isopropylpyridine; 2-propylpyridine; 2-butylpyridine; 4-propylpyridine; 4-isopropylpyridine; 4-butylpyridine or 4-benzylpyridine, are effective agents within the scope of the invention. Also, alkyl-substituted quinolines and isoquinolines, such as 2-methylquinoline (quinaldine), and the quinolines or isoqunolines substituted with alkyl radicals of 2 to 10 carbon atoms, may be used.

The particularly desirable aralkyl substituents in the pyridine, quinoline or isoquinoline include the following groups:

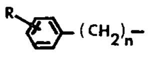
or
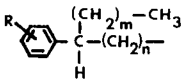

whereby R means an alkyl radical with 1 to 12 carbon atoms, *m* and *n* are integers from 0 to 10 with the condition that $m + n \leqq 10$. Particularly preferred are those where the aromatic portion is phenyl and the alkyl portion has $C_1$ to $C_{10}$ carbon atoms.

On the other hand, collidine (2,4,6-trimethylpyridine) makes the PI film entirely brittle. Tertiary aliphatic amines such as trimethylamine, triethylamine, tripropylamine and tributylamine cause such great embrittlement of the PI films that when the test films are pulled off they shatter like glass. In addition, the last-named aliphatic amines have the unpleasant characteristic of greatly increasing the absolute viscosity of the PACA solutions and gelling the solution, which makes the PACA solutions very difficult or impossible to fabricate.

Since the aliphatic amines, as well as triethanolamine and triethylenediamine, and furthermore N-ethylpiperidine, N-methylmorpholine, indolenine, 1,2,3,4-tetrahydroquinoline and N-ethylimidazole cause embrittlement of the polyimides and are thus harmful, and since pyridine, N-methylpyrrole and N,N-dimethylaniline are virtually ineffective, there is apparently a specific action, limited to the above-named tertiary amines, through the structure of certain alkyl-, aralkyl- or alkylene-substituted, quasi-aromatic 6-ring heterocyclic compounds containing tertiary nitrogen.

The above-mentioned tertiary amines which are added in accordance with the invention, however, produce little or no increase in the absolute viscosity of the solution.

It is desirable that the quantity of the added pyridine derivatives amount to between 1% and 200% by weight, preferably between 20 and 140%, with reference to the solid content of the PACA solution. It is also possible, however, to use larger quantities of amine than stated, in the form of solvent components to some extent.

An optimum relationship between the quantity used and the effect achieved has proved in practice to be the addition of a quantity of amine that is approximately equivalent to the carboxyl groups present in the PACA, although the addition of smaller amounts than the optimum will permit the achievement of a degree of improvement of the characteristics of the PI films. In the case of the preferentially used quinoline, the amine proportion of approximately 60% of the weight of the PACA based on pyromellitic acid dianhydride and diaminodiphenylether may be considered as optimum. In a 15% solution of the PACA, the percentage of quinoline in the solution will be approximately 9%. Generally, the amine is present in an amount of between 1 and 200 percent, preferably between 20 and 100 percent, based on the weight of the PACA.

The polyamide carboxylic acid which can be formed into polyimide by the cyclodehydration thereof in the presence of the above-noted amines are products of the reaction of dianhydrides of aromatic tetracarboxylic acids based on phenyl, naphthyl, anthracyl, phenanthryl and biphenyl or other mono- or polynuclear aromatic rings, with mononuclear aromatic diamines which can also be chlorine-substituted, and whose nuclei can be joined by an -O-,-$SO_2$-,-$CH_2$- or -CONH-bridge. It should be understood that the dianhydrides of the aromatic tetracarboxylic acids can be of any number of different mononuclear or polynuclear tetracarboxylic acids. Suitably, they can be of a tetracarboxylic acid of benzene or a substituted benzene, naphthylene or a substituted naphthylene, phenanthrene or a substituted phenanthrene, anthracene or a substituted anthracene. These aromatic nuclei can be substituted with any of a wide variety of substituents including halides, nitrogen-containing radicals such as nitrates, amines, amides, organic radicals such as $C_1$–$C_8$ alkyl radicals and the like. The same applies to the mononuclear or polynuclear aromatic diamines which are a component of the polyamide carboxylic acids employed. These mononuclear and polynuclear aromatic diamines include diamines of benzene, naphthylene, phenanthrene and anthracene. These aromatic moities can be substituted with a wide variety of the ortho-, meta- and para- directing forms such as halides, nitrates, amines, amides, cyano groups and organic radicals such as alkyl radicals from $C_1$ to $C_8$ carbon atoms, alkenyl radicals of $C_2$ to $C_8$ carbon atoms, acetyl radicals and other organic-containing radicals having an alkyl or alkenyl residue of between 2 and 8 carbon atoms such as alkoxy radicals and the like.

It should be understood that the polyamide carboxylic acids can generally be prepared from the dianhydrides of aromatic tetracarboxylic acids, mononuclear or polynuclear aromatic diamines by a process which is known per se and described e.g. in U.S. Pat. No. 3,179,634.

The polyamide carboxylic acids preferentially used in accordance with the invention can be prepared in a known manner by the reaction of aromatic diamines, such as diaminodiphenylether, diaminodiphenyl methane, m-phenylenediamine, p-phenylene-diamine, diaminodiphenylsulfone, benzidine, m- or p- xylylenediamine with tetracarboxylic acid dianhydride, as, for example, pyromellitic acid dianhydride or 3,3',4,4'-benzophenonetetracarboxylic acid dianhydride. The reaction usually occurs in an aprotic polar organic solvent as mentioned below.

Examples of solvents for the PACA in the process of the invention are the known and proven polar aprotic solvents, especially those of the class of the N,N-dialkylcarboxylic acid amides, such as dimethylformamide, diethylformamide, diethylacetamide, dimethylacetamide, dimethylsulfoxide, dimethylsulfone, tetramethylenesulfone, pyridine; also, N-alkyl-substituted lactams such as N-methylpyrrolidone: and mixtures of these solvents with non-solvents of PACA, such as ethers, cyclic ethers, esters, lactones, nitriles and aromatic and aliphatic hydrocarbons such as benzene, toluene and xylene, tetraline and decaline. When phenolic solvents are used, however, the addition of amine is found to produce no improvement of the film quality. The concentration of the PACA in the said solvents or solvent mixtures lies between 4% and 40%, preferably between 8% and 30%. In the above, the alkyl groups are $C_1$–$C_5$.

The addition of the amines can be made in any desired manner before the cyclodehydration. The amine-containing PACA solutions may be prepared by first synthesizing the PACA solution, either by the method of German Offenlegungsschrift No. 1,420,706 or by the dispersion method of German Offenlegungsschrift No. 2,004,495, and then stirring the amine into it, or by having the amine already present as a component in the reaction medium used for the synthesis of the PACA. When PACA solutions in the above-named solvents in the presence of aliphatic tertiary amines are prepared, nothing but polyamide carboxylic acids of low molecular weight and low reduced specific viscosities are obtained which are not usable for the preparation of films as disclosed by G. M. Bower, J. Polymer Sci. A-1, (1963), p. 3135. However, PACA solutions can be synthesized, pursuant to the invention, in the presence of the amines of the invention, in which the reduced specific viscosity of the PACA is entirely sufficient for the manufacture of films as evidenced from Example 14 below.

Likewise, the addition of the tertiary amine can be made during or after the dissolution in a suitable solvent or solvent mixture of a PACA synthesized in some other manner (say according to German Offenlegungsschrift No. 1,904,396). The amine may also be sprayed onto the PACA solution while the latter is spread out in a shallow depth. The mechanical properties of the PI films are especially enhanced when the tertiary amines are added prior to the thermal cyclization process. The improvements were studied in comparative tests with PI films which had been obtained under identical cyclization conditions without the addition of amine.

The tensile strength of a 50-micron film based on a poly-(4,4'-diaminodiphenylether)-pyromellitic imide increases from 850–1000 $kp/cm^2$ to 1100–1400 $kp/cm^2$, and elongation at failure increases from 10–20% to 35–80%, and the reflex folding frequency increases from several tens of thousands to more than one hundred thousand. It is a great advantage that these results are achieved even when the cyclodehydration is performed in the air, which is technically much simpler than cyclization under inert gas or in a vacuum. The reduced specific viscosity ($\eta sp/c$) of the PACA, measured in an 0.5% solution in dimethylformamide at 20°C, is to range from 0.3 to 4, preferably from 0.4 and 3, an additional advantage of the process being found in the fact that elongation in the above-mentioned range between 35% and 80% can be achieved even in PI films on a basis of PACA's of relatively low molecular weight with reduced viscosities between 0.4 and 1.4.

On the basis of polyamide carboxylic acids with such low reduced viscosities, it has hitherto been impossible to achieve elongations anywhere near 35%, even under the most favorable cyclization conditions (M. Wallach, Polymer Preprints 8, p. 656 (1967). Since it is desirable to keep the reduced specific viscosities of the PACA as low as possible, in order to prepare still fluid PACA solutions with the highest possible solid content, the addition of the tertiary amines of the invention to such PACA's of low molecular weight is especially valuable.

In order to more fully illustrate the invention and the manner of practicing the same, the following examples are presented. In these examples, the mechanical values have been measured at room temperature unless otherwise specified:

EXAMPLES

Examples 1 to 4 and Comparison Example 5:

a. Preparation of PACA solution.

In a 20-liter reactor which can be heated externally, equipped with a thermometer and steplessly controllable stirrer, 359 g (1.795 moles) of diaminodiphenylether (DADE) and 391 g (1.795 moles) of pyromellitic acid dianhydride (PMDA) are dispersed in 1.7 kg of distilled xylene and the dispersion is heated to 35°C. With strong stirring, 2.6 kg of dimethylformamide distilled over $P_2O_5$ are added over a period of 30 seconds. With the internal temperature of the reaction mixture raised from 35°C to 46°C, the reaction of diamine and dianhydride to the polyamide carboxylic acid takes place. Within 60 minutes a viscous solution develops, which has a solid content of 15%. The reduced specific viscosity of the PACA, measured in an 0.5% DMF solution, amounts to 1.25.

b. Preparation of the Polyimide Films 100-gram specimens are taken from the PACA solution obtained under a) and 9.2 g of quinoline (Example 1), 4.6 g of quinoline (Example 2), 8.7 g of 4-isopropylpyridine (Example 3) and 9 g of isoquinoline (Example 4) are added and the amines are well mixed into the solution. By means of a squeegee the solutions are spread out in a thickness of 0.77 mm on glass plates. In the same manner, a specimen of the PACA solution obtained under a) was spread out in a thickness of 0.7 mm without the addition of amine (Comparison Example 5).

In a circulating-air oven with heated plates the outspread solutions were pre-dried for 30 minutes at 70°C to form PACA films. Over another 45 minutes the temperature is increased to 300°C and held at 300°C for 15 minutes. Then the temperature was raised to 350°C and held as this level for 30 minutes. Both the pre-drying to the PACA film and the cyclodehydration take place in air atmosphere.

The PI films obtained in this manner have a thickness between 47 μm and 54 μm. The film from Example 1 has the following weight losses on the basis of thermogravimetric analysis (air atmosphere; heating rate:

8°C/min): 1% at 533°C; 5% at 578°C; 10% at 594°C and 20% at 603°C. Thus, there are no longer any volatile substances present in the PI and acting as plasticizers.

The following table shows the mechanical characteristics of PI films prepared with the addition of amine (Examples 1 to 4) and without amine (Comparison Example 5).

The table shows the substantially improved mechanical characteristics of the PI films obtained with the addition of amines in comparison with the one obtained in the Comparison Example 5.

| Amine added[1] | | | Tensile strength kp/cm² | Elongation % | Reflex folding frequency[2] |
|---|---|---|---|---|---|
| Example 1 | 9.2 g | quinoline(61%) | 1200 | 50 | >200,000 |
| Example 2 | 4.6 g | quinoline(30%) | 1110 | 40 | >200,000 |
| Example 3 | 8.7 g | isopropyl-pyridine (58%) | 1130 | 38 | >200,000 |
| Example 4 | 9.0 g | isoquinoline (60%) | 1180 | 35 | >100,000 |
| Comparison Example 5 | — | | 920 | 15 | 26,000 |

Example 6 a portion (50 g) of the PACA solution prepared under 1a) was spread out with a squeegee into a film 0.7 mm thick on a glass plate and then sprayed with 4 g of 2,6-lutidine (2,6-dimethylpyridine). Drying and cyclodehydrating were performed in the same manner as in Examples 1 to 4.

| | | |
|---|---|---|
| Properties of the PI film: | Thickness: | 48 μm |
| | Tensile strength: | 1100 kp/cm² |
| | Elongation: | 37% |
| | Reflex folding frequency: | greater than 100,000 |

Examples 7 and 9 and Comparison Examples 8 and 10:

100 g of the PACA solution prepared in accordance with Example 1a) were treater with 9.2 g of quinoline (61% with reference to solid content) and spread out in a thickness of 0.77 mm with a squeegee on 2 glass plates. Pre-drying to PACA films was performed for 1 hour under a vacuum at 50°C (Example 7) in one case and for 45 minutes at 70°C under a pure nitrogen atmosphere (Example 9) in the other. Cyclodehydration was performed in Example 7 under a vacuum (1 Torr) and in Example 9 under pure nitrogen folloeing the same temperature schedule: Heating to 300°C within 45 and 55 minutes, respectively, 15 minutes at 300°C, and then 30 minutes at 350°C. Honey-yellow PI films of a thickness of 48 to 53 μm were obtained.

For comparison, one PI film was prepared under the same cyclization conditions as in Example 7 and 9, using the PACA solution obtained under 1a) without the addition of quinoline (Comparison Examples 8 and 10, respectively).

| | | Tensile strength kp/cm² | Elongation % | Reflex folding frequency |
|---|---|---|---|---|
| Example 7 | Vacuum | 1380 | 63 | >200,000 |
| Comparison Example 8 | Vacuum | 1060 | 22 | 48,000 |
| Example 9 | Inert gas | 1280 | 58 | >200,000 |
| Comparison Example 10 | Inert gas | 1040 | 25 | 62,000 |

Example 11 a. Preparation of the PACA solution

In a 2-liter round flask equipped with stirrer and thermometer, 43 g (0.215 mole) of diaminodiphenylether were dissolved in 510 g of dimethylformamide and 47 g (0.216 mole) of pyromellitic dianhydride were added portion-wise with stirring, so that the temperature of the reaction mixture would not rise above 35°C. When the addition of the dianhydride had been completed, the solution was stirred for 2 hours at room temperature. A clear, viscous, 15% PACA solution was obtained having a reduced specific viscosity of 1.76 measured in dimethylformamide (0.5%).

b. Preparation of films

Into 100 g of the PACA solution prepared under 11*a*), 15 g of quinoline (100% with reference to the solid content of the solution) was added with stirring.

The solution was spread out in a thickness of 0.8 mm by means of a squeegee, and it was cyclized in air as in Examples 1 to 4. A film 48 to 51 μm was obtained which had a tensile strength of 1340 kp/cm², an elongation of 64% and a reflex folding frequency of greater than 100,000.

A PI film obtained from the above PACA solution under identical cyclization conditions without the addition of quinoline had a tensile strength of 1020 kp/cm², an elongation of 19% and a reflex folding frequency of 39,000.

Example 12

Into 100 g of PACA solution prepared under Example 11*a* were stirred 6 g of 3,5-dimethylpyridine (40% with reference to the solid content of the solution).

The PI film prepared under the cyclization conditions described in Examples 1 to 4 had a thickness of 50 μm, a tensile strength of 1290 kp/cm², an elongation of 43%, and a reflex folding frequency of greater than 100,000.

Example 13 a. Preparation of PACA solution

In a 2-liter round flask equipped with stirrer and thermometer, 43 g (0.215 mole) of diaminodiphenylether were dissolved in 810 g of dimethylacetamide, and 47 g (0.216 mole) of pyromellitic acid dianhydride were added portion-wise with external cooling such that the internal temperature of the reaction mixture did not rise above 30°C. After all of the dianhydride had been added, the mixture was stirred for 2 hours at room temperature. A viscous, 10% PACA solution was obtained having a reduced specific viscosity of 2.74.

b. Preparation of PI film

Into 100 g of the PACA solution prepared under (10*a*) 5 g of 2-butylpyridine (50% with reference to the solid content) was stirred and the solution was spread out with a squeegee in a thickness of 0.85 mm on a glass plate. Most of the solvent was evaporated at 70°C within 45 minutes in an air atmosphere and the PACA film was then heated to 350°C for cyclodehydration using a heating rate of 4°C per minute, and left at this temperature for 30 minutes. A 43 μm thick PI film was obtained with a tensile strength of 1380 kp/cm², an elongation of 82% and a reflex folding frequency of greater than 200,000.

A PI film prepared from the PACA solution obtained under (13*a*) without the addition of amine and cyclized under the same conditions has a tensile strength of 1050 kp/cm², an elongation of 20% and a reflex folding frequency of 74,000.

Example 14 a. Preparation of the PACA solution containing quinoline

In a round flask provided with stirrer and thermometer 16 g of diaminodiphenylether and 17.5 g of pyromellitic acid dianhydride were dispersed in 76 g of xylene and the dispersion was heated externally to 30°C. A mixture of 94 g of dimethylformamide and 20.5 g of quinoline was then poured in over a period of 30 seconds with stirring. The internal temperature of the reaction mixture rose to 42°C and a viscous PACA solution was formed. The solid content was 15% and the reduced specific viscosity 1.15.

b. Preparation of the PI film

The PACA solution obtained under (*a*) was spread onto a glass plate in a thickness of 0.7 mm with a squeegee and transformed to the PI film in an air atmosphere under the conditions of Example 13*b*.

The 50 μm thick film has a tensile strength of 1190 kp/cm², an elongation of 54% and a reflex folding frequency of greater than 200,000.

The same results were obtained by the use of an equi-molecular amount of quinaldine instead of quinoline.

What is claimed is:

1. In a process for the manufacture of a polyimide by the thermal cyclodehydration of a polyamide carboxylic acid, the improvement which comprises carrying out the cyclodehydration in the presence of a nitrogen compound selected from the group consisting of quinoline, isoquinoline, monoalkyl substituted pyridine, dialkyl substituted pyridine, mono aralkyl substituted pyridine, diaralkyl substituted pyridine, mono alkyl substituted quinoline, dialkyl substituted quinoline, mono aralkyl substituted quinoline, diaralkyl substituted quinoline, mono alkyl substituted isoquinoline, dialkyl substituted isoquinoline, mono aralkyl substituted isoquinoline and diaralkyl substituted isoquinoline and mixtures thereof, said polyamide carboxylic acid being the reaction product of a dianhydride of an aromatic tetracarboxylic acid with a mono or polynuclear aromatic diamine, the nitrogen compound being present in an amount between 1 and 200% by weight based upon the solids content of the polyamide carboxylic acid, said process being carried out in the absence of a chemical dehydrating agent.

2. An improvement according to claim 1 wherein said polyamide carboxylic acid is present in the form of a solution.

3. An improvement according to claim 1 wherein said polyamide carboxylic acid is the reaction product of diaminodiphenylether and pyromellitic acid dianhydride in an aprotic polar solvent or solvent mixture.

4. A process according to claim 2 wherein the solvent of the solution is selected from the group consisting of dimethylformamide, dimethylacetamide, N-methylpyrrolidone with or without addition of an aromatic hydrocarbon.

5. A process according to claim 1 wherein the cyclodehydration is carried out thermally at a temperature between 120°C and 500°C.

6. A process according to claim 1 wherein the polyamide carboxylic acid is in the form of a solution having a reduced specific viscosity between 0.3 and 4 determined in a 0.5% solution of dimethylformamide.

7. A polyimide sheet derived from a dianhydride of an aromatic tetracarboxylic acid and a mono or polynuclear aromatic amine, said sheet having a reflex folding frequency, determined by bending the same about a line, at room temperature, until it fails, of at least 100,000, said polyimide sheet prepared from a polyimide which has been prepared by a thermal cyclodehydration of a polyamide carboxylic acid carried out in the absence of a chemical dehydrating agent and in the presence of a nitrogen compound selected from the group consisting of quinoline, isoquinoline, monoalkyl substituted pyridine, dialkyl substituted pyridine, mono aralkyl substituted pyridine, diaralkyl substituted pyridine, mono alkyl substituted quinoline, dialkyl substituted quinoline, mono aralkyl substituted quinoline, diaralkyl substituted quinoline, mono alkyl substituted isoquinoline, dialkyl substituted isoquinoline, mono aralkyl substituted isoquinoline and diaralkyl substituted isoquinoline and mixtures thereof, said polyamide carboxylic acid being the reaction product of a dianhydride of an aromatic tetracarboxylic acid with a mono or polynuclear aromatic diamine, the nitrogen compound being present in an amount between 1 and 200% by weight based upon the solids content of the polyamide carboxylic acid.

8. A polyimide sheet according to claim 7 having an elongation at break of at least 35%.

9. A polyimide sheet according to claim 8 wherein said elongation is between 35 and 80%.

10. A polyimide sheet according to claim 7 having a tensile strength of between 1100 and 1400 kp/cm².

11. A polyimide sheet according to claim 9 having a thickness of 50 μm.

12. A polyimide forming solution consisting essentially of a polyamide carboxylic acid and a nitrogen compound selected from the group consisting of quinoline, isoquinoline, a mono alkyl substituted pyridine, a dialkyl substituted pyridine, a mono aralkyl substituted pyridine, a diaralkyl substituted pyridine, a mono alkyl substituted quinoline, a dialkyl substituted quinoline, a mono aralkyl substituted quinoline, a diaralkyl substituted quinoline, a mono alkyl substituted isoquinoline, a dialkyl substituted isoquinoline, a mono aralkyl substituted isoquinoline, a diaralkyl substituted isoquinoline and mixtures thereof.

13. A solution according to claim 12 wherein said polyamide carboxylic acid is the reaction product of a dianhydride of an aromatic tetracarboxylic acid with a mononuclear or polynuclear aromatic diamine.

14. A solution according to claim 13 wherein said polyamide carboxylic acid is the reaction product of diaminodiphenylether and pyromellitic acid dianhydride.

15. A solution according to claim 12 wherein solvent of the solution is an aprotic polar organic solvent and said nitrogen compound is selected from the group consisting of 2-methylpyridine, 3-methylpyridine, 4-methylpyridine, 2,4-dimethylcyridine, 2,5-dimethylpyridine, 2,6-dimethylpyridine, 3,5-dimethylpyridine, 2,3-dimethylpyridine, quinoline, isoquinoline, 2-isopropylpyridine, 2-propylpyridine, 2-butylpyridine, 4-propylpyridine, 4-isopropylpyridine, 4-butylpyridine, 4-benzylpyridine, 2-methylquinoline and mixtures thereof.

16. A process according to claim 1 wherein said nitrogen compound is selected from the group consisting of 2-methylpyridine, 3-methylpyridine, 4-methylpyridine, 2,4-dimethylpyridine, 2,5-dimethylpyridine, 2,6-dimethylpyridine, 3,5-dimethylpyridine, 2,3-dimethlpyridine, quinoline, isoquinoline, 2-isopropylpyridine, 2-propylpyridine, 2-butylpyridine, 4-propylpyridine, 4-isopropylpyridine, 4-butylpyridine, 4-benzylpyridine, 2-methlquinoline and mixtures thereof.

17. A solution according to claim 15 wherein said solvent is selected from the group consisting of dimethylformamide, dimethylacetamide, N-methylpyrrolidone with or without addition of an aromatic hydrocarbon.

18. In a process for the manufacture of a polyimide by the thermal cyclodehydration of a polyamide carboxylic acid, the improvement which comprises carrying out the cyclodehydration in the presence of a nitrogen compound selected from the group consisting of isoquinoline, monoalkyl substituted pyridene, dialkyl substituted pyridene, monoaralkyl substituted pyridene, diaralkyl substituted pyridene, monoalkyl substituted quinoline, dialkyl substituted quinoline, monoaralkyl substituted quinoline, diaralkyl substituted quinoline, monoalkyl substituted isoquinoline, dialkyl substituted isoquinoline, monoaralkyl, substituted isoquinoline and diaralkyl substituted isoquinoline and mixtures thereof, said process being carried out in the absence of a chemical dehydrating agent.

19. A process for forming a polyimide article which comprises placing onto a surface a polyamide carboxylic acid in admixture with a nitrogen compound selected from the group consisting of quinoline, isoquinoline, monoalkyl substituted pyridene, dialkyl substituted pyridene, monoaralkyl substituted pyridene, diaralkyl substituted pyridene, monoalkyl substituted quinoline, dialkyl substituted quinoline,, monoaralkyl substituted quinoline, diaralkyl substituted quinoline, monoalkyl substituted isoquinoline, dialkyl substituted isoquinoline, monoaralkyl substituted isoquinoline and diaralkyl substituted isoquinoline and mixtures thereof and subjecting said polyamide carboxylic acid in the presence of said nitrogen compound to thermal cyclodehydration by heating the admixture at a temperature between 120° and 500°C, said process being carried out in the absence of a chemical dehydrating agent.

20. A process according to claim 19 wherein said nitrogen compound is selected from the group consisting of isoquinoline, monoalkyl substituted pyridene, dialkyl substituted pyridene, monoaralkyl substituted pyridene, diaralkyl substituted pyridene, monoalkyl substituted quinoline, dialkyl substituted quinoline, monoaralkyl substituted quinoline, diaralkyl substituted quinoline, monoalkyl substituted isoquinoline, dialkyl substituted isoquinoline, monoaralkyl isoquinoline and diaralkyl substituted isoquinoline and mixtures thereof.

* * * * *

UNITED STATES PATENT AND TRADEMARK OFFICE

CERTIFICATE OF CORRECTION

PATENT NO. : 3,947,402

DATED : March 30, 1976

INVENTOR(S) : Norbert Vollkommer & Erich Behr

It is certified that error appears in the above-identified patent and that said Letters Patent are hereby corrected as shown below:

Column 7, about line 25

Footnotes 1) and 2) have been omitted from the end of the table. They should read as follows:

-- 1) The percentages refer to the solid content of the solution.

2) At the values of >100,000 and >200,000, respectively, the tests were discontinued because these values are far greater than the technical stresses encountered. The method used was that described in DIN 53374. --

Also the entire table with footnotes should be before the paragraph starting at line 9 beginning "The table shows . . .".

Column 11, line 14

"2,4-dimethylcyridine" should be "2,4-dimethylpyridine".

Signed and Sealed this

Third Day of August 1976

[SEAL]

*Attest:*

RUTH C. MASON
*Attesting Officer*

C. MARSHALL DANN
*Commissioner of Patents and Trademarks*